United States Patent
Baldwin et al.

[11] Patent Number: 6,066,840
[45] Date of Patent: May 23, 2000

[54] APPARATUS FOR CONTROLLING THE TEMPERATURE OF FOOD IN A CASSEROLE DISH AND METHOD FOR CONTROLLING THE TEMPERATURE OF FOOD IN A CASSEROLE DISH

[75] Inventors: Wayne D. Baldwin, Asheboro; Julie C. Lambert, Franklinville, both of N.C.

[73] Assignee: Vesture Corporation, Asheboro, N.C.

[21] Appl. No.: 09/070,312

[22] Filed: Apr. 30, 1998

[51] Int. Cl.[7] ...................................................... H05B 6/80
[52] U.S. Cl. .................................... 219/725; 99/DIG. 14
[58] Field of Search ................................... 219/725, 730, 219/734; 607/114, 112, 108; 99/DIG. 14; 128/402

[56] References Cited

U.S. PATENT DOCUMENTS

| | | |
|---|---|---|
| D. 343,088 | 1/1994 | Owens . |
| D. 346,062 | 4/1994 | Owens . |
| 4,756,311 | 7/1988 | Francis, Jr. et al. ...................... 128/403 |
| 5,150,107 | 9/1992 | Anderson et al. ....................... 128/402 |
| 5,260,536 | 11/1993 | Peery . |
| 5,300,105 | 4/1994 | Owens . |
| 5,307,647 | 5/1994 | Mcclure et al. ........................... 62/371 |
| 5,339,541 | 8/1994 | Owens . |
| 5,345,784 | 9/1994 | Bazemore et al. . |
| 5,357,693 | 10/1994 | Owens . |
| 5,424,519 | 6/1995 | Salee et al. ............................... 219/759 |
| 5,478,988 | 12/1995 | Hughes et al. ........................... 219/730 |
| 5,500,010 | 3/1996 | Owens . |
| 5,545,198 | 8/1996 | Owens . |
| 5,575,812 | 11/1996 | Owens . |
| 5,591,221 | 1/1997 | Owens . |
| 5,601,744 | 2/1997 | Baldwin . |
| 5,630,959 | 5/1997 | Owens . |
| 5,700,284 | 12/1997 | Owens . |

*Primary Examiner*—Teresa Walberg
*Assistant Examiner*—Jeffrey Pwu
*Attorney, Agent, or Firm*—Merchant & Gould P.C.

[57] ABSTRACT

An apparatus for controlling the temperature of food in a casserole dish is provided. The apparatus includes a casserole dish, a casserole lid, a thermal unit, and a container constructed for holding the thermal unit and the casserole dish in thermally conductive contact. A method for controlling the temperature of food in a casserole dish is provided. The thermal unit can be heated by placing the thermal unit in a microwave oven, and the thermal unit can be cooled by placing the thermal unit in a freezer.

8 Claims, 3 Drawing Sheets

APPARATUS FOR CONTROLLING THE TEMPERATURE OF FOOD IN A CASSEROLE DISH AND METHOD FOR CONTROLLING THE TEMPERATURE OF FOOD IN A CASSEROLE DISH

FIELD OF THE INVENTION

The invention relates to an apparatus for controlling the temperature of food in a casserole dish and to a method for controlling the temperature of food in a casserole dish.

BACKGROUND OF THE INVENTION

Numerous apparatus are available for keeping food warm after it has been prepared. U.S. Pat. No. 5,630,959, assigned to Vesture Corporation, describes a microwavable pad for heating food. The microwavable pad can be heated in a microwave oven and placed in a container, such as a bread basket, and used to keep the food warm for an extended period of time.

SUMMARY OF THE INVENTION

An apparatus for controlling the temperature of food in a casserole dish is provided by the present invention. The apparatus includes a casserole dish, a casserole lid for the casserole dish, a thermal unit which is constructed for placement in a microwave oven for heating or in a freezer for cooling, and which will provide a heat source or a heat sink for an extended period of time, and a container constructed for holding the thermal unit and the casserole dish in thermally conductive contact.

A method for controlling the temperature of food in a casserole dish is provided by the present invention. The method includes a first step of providing a food warming apparatus which includes casserole dish, a casserole lid, a thermal unit, and a container for holding the thermal unit and the casserole dish in thermally conductive contact. The method includes a step of altering the temperature of the thermal unit. A thermal unit can be heated by placing the thermal unit in a microwave oven. Alternatively, the thermal unit can be cooled by placing the thermnal unit in a freezer.

DETAILED DESCRIPTION OF THE PREFERRED EMBODIMENT

Figure 1:
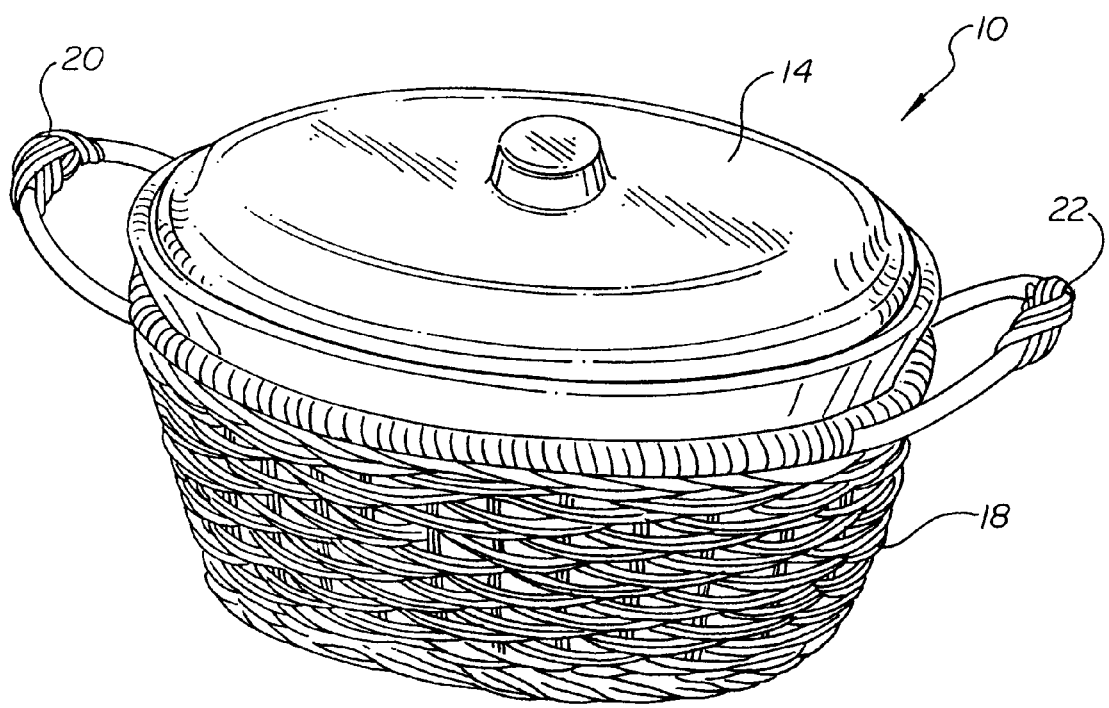
FIG. 1 is a perspective view of the apparatus for controlling the temperature of food in a casserole dish according to the principles of the present invention.
Figure 2:
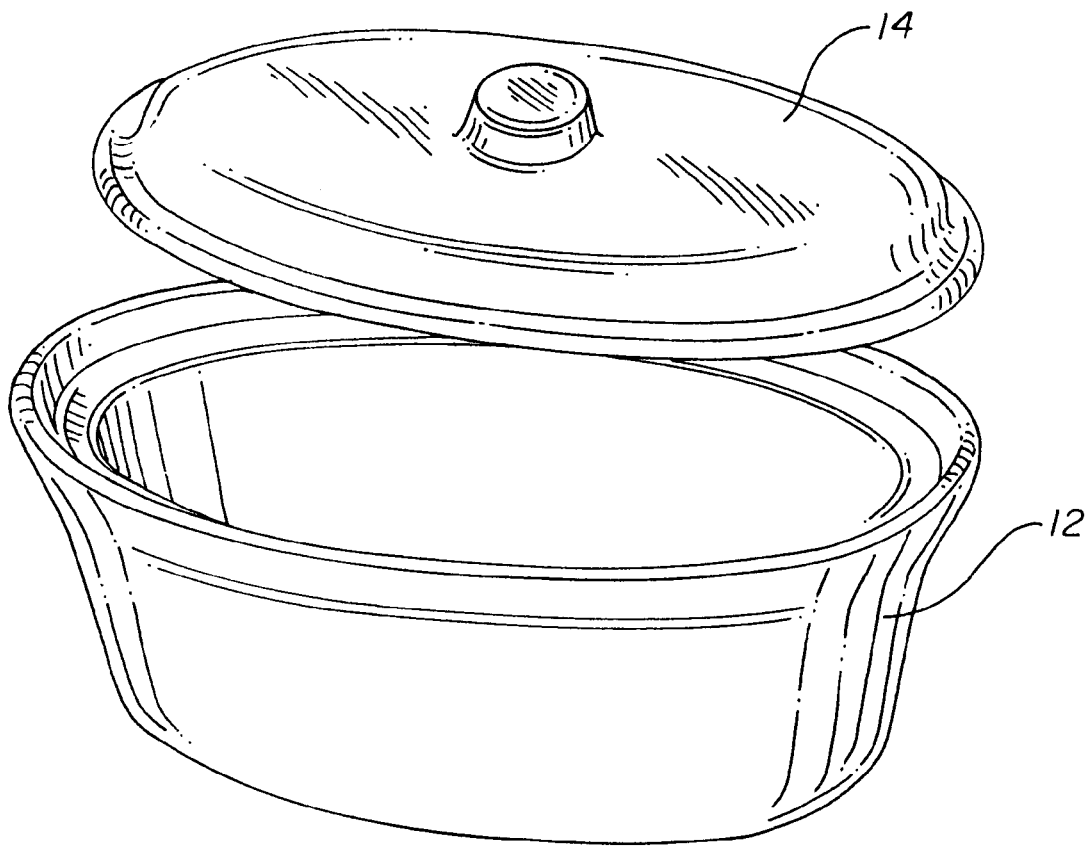
FIG. 2 is a perspective view of the casserole dish of the apparatus of FIG. 1.
Figure 3:
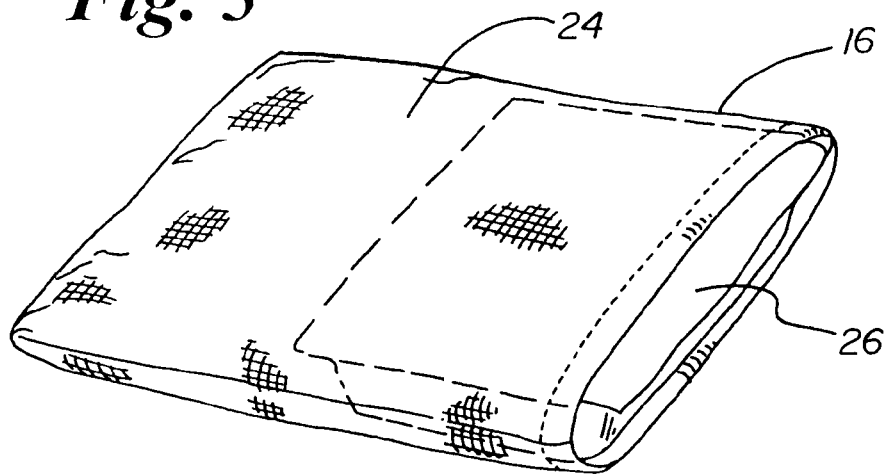
FIG. 3 is a perspective view of the thermal unit of the apparatus of FIG. 1.
Figure 4:
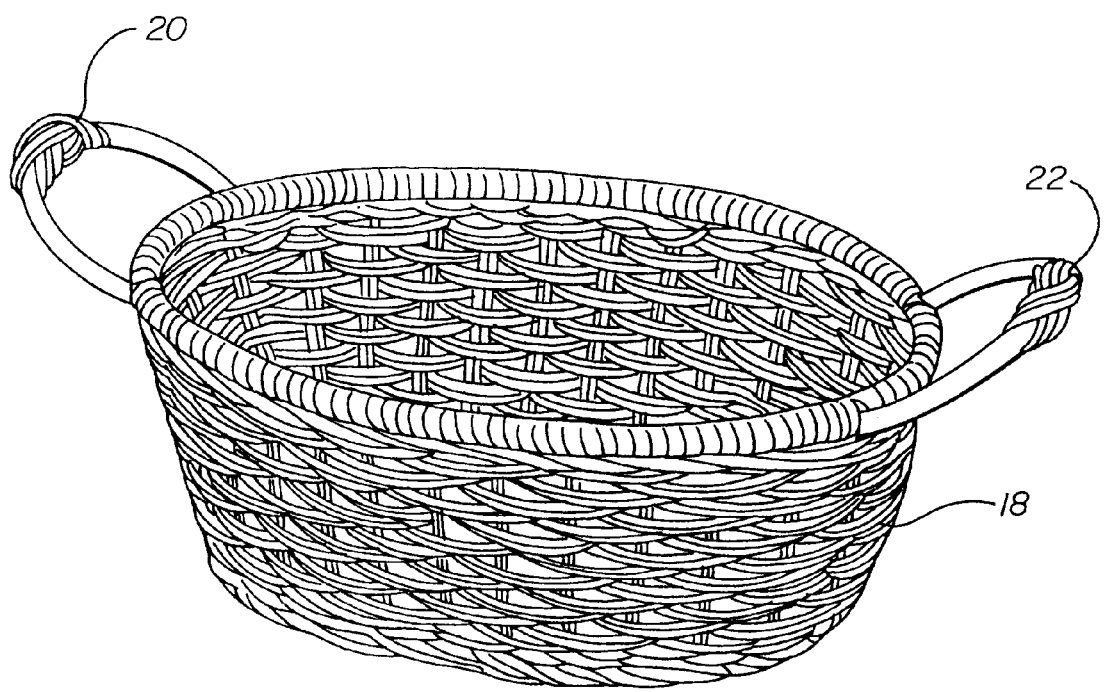
FIG. 4 is a perspective view of the display container for holding the casserole dish and the thermal unit of the apparatus of FIG. 1.

Referring to FIGS. 1–4, the apparatus for controlling the temperature of food in a casserole dish according to the present invention is indicated at reference numeral 10. The apparatus 10 can be used to maintain the temperature of food within a casserole dish for extended periods of time. Maintaining the temperature of food within a casserole dish includes maintaining the high temperature or the low temperature of the food. That is, if the food within the casserole dish is hot, the apparatus 10 can be used to maintain the hot temperature. If the food within the casserole dish is cold, the apparatus then can be used to maintain the cold temperature of the food.

It should be appreciated that the apparatus for controlling the temperature of food in a casserole dish 10 is provided without an external electrical cord. Furthermore, the apparatus 10 can be placed on a dinner table during a meal and provide an aesthetically pleasing display.

The apparatus 10 includes a casserole dish 12, casserole lid 14, thermal unit 16, and display container 18. These components can all be assembled to provide the apparatus 10 so that the thermal unit 16 is provided in thermal contact with the food within the casserole dish 12. It should be appreciated that the phrase "thermally conductive contact" refers to the conduction of heat energy either from the thermal unit 16 to the food within the casserole dish 12, or the conduction of energy from the food to the thermal unit 16.

The casserole dish 12 and the casserole lid 14 are commonly known. Casserole dishes and lids are available in numerous retail stores and are typically constructed so they can go directly from the freezer to the oven. That is, food can be stored in the casserole dish in the freezer, and then introduced into a hot oven for cooking and heating the food within the casserole dish. Typical casserole dish and lid combinations are manufactured from ceramic materials. A requirement of the present invention is that the casserole dish 12 and the casserole lid 14 are constructed so they will be received within the display container 18.

The display container 18 is preferably a woven basket-type container having handles 20 and 22 which allow one to carry the apparatus 10. The display container is preferably one which will provide an aesthetically pleasing view of the apparatus 10. While a woven basket is provided as a preferred embodiment of the display container 18, it should be appreciated that additional types of display containers can be provided. In addition, it should be appreciated that the function of the display container 18, in addition to providing an aesthetically pleasing view of the apparatus 10, is to provide a level of thermal insulation between the casserole dish 12 and the individual who may be handling the apparatus 10. In addition, the display container 18 provides for keeping the casserole dish 12 and the thermal unit 16 in thermally conductive contact.

The thermal unit 16 is provided as the source for controlling the temperature of the food within the casserole dish 12 for an extended period of time. The thermal unit 16 includes a cloth cover 24 and a sealed envelope 26. The sealed envelope encloses a thermal retention fluid which can be heated by microwave energy or cooled by placement in a refrigerator or freezer. The thermal unit 16 can be manufactured according to U.S. Pat. No. 5,630,959 to Owens, the entire disclosure of which is incorporated herein by reference. Furthermore, the thermal unit 16 can be purchased from Vesture Corporation under the mark Microcore®. It should be appreciated that various other types of thermal units can be used provided that they are capable of being heated in a microwave oven or cooled in a refrigerator or freezer. It is generally preferred, however, that the thermal unit be one which resists leakage even if punctured. The fluid within the thermal unit can be water or other types of aqueous slurry, including water with adjuvant such as preservative.

The cloth cover 24 is provided to allow ease of handling of the thermal unit 16 from the microwave oven to placement at the bottom of the display container 18.

The display container 18 is provided for receiving the thermal unit 16 and the casserole dish 12. Preferably, the thermal unit 16 is placed at the bottom of the display container 18, and the casserole dish 12 is placed over the thermal unit 16. Accordingly, when placed in this arrangement, the thermal unit 16 and the casserole dish 12 are in thermally conducted contact so that the food provided within the casserole dish 12 receives heat. In addition, the display container 18 serves as a insulator to reduce the loss of heat through the container walls.

When the Microcore® device is used as the thermal unit 16, it can be placed in a microwave oven and heated on high for about 3 minutes in order to achieve a temperature of about 180° F. The thermal unit will then cool to a temperature of about 140° F after 120 minutes. When the Microcore® device is refrigerated and provided at a temperature of 33° F., it will achieve a temperature of about 40° F. after about 120 minutes. It should be appreciated that the above-identified thermal values are based upon the Microcore® device being present at a room temperature of 78° F. after heating in a microwave oven or cooling in a freezer.

The detailed description of the invention is provided for illustration of the invention and is not intended to limit the scope of the appended claims.

We claim:

1. An apparatus for controlling the temperature of food in a casserole dish, said apparatus comprising:
    a casserole dish;
    a casserole lid for the casserole dish;
    a thermal unit which is constructed for placement in a microwave oven for heating or in a freezer for cooling, and which will provide a heat source or a heat sink for an extended period of time; and
    a container constructed for holding the thermal unit and the casserole dish in thermally conductive contact; wherein the thermal unit is provided between the casserole dish and the container and is removable for placement in a microwave oven or a freezer.

2. A method for controlling the temperature of food in a casserole dish, said method comprising steps of:
    (a) providing a food warming apparatus comprising:
        a casserole dish;
        a casserole lid for the casserole dish;
        a thermal unit which is constructed for placement in a microwave oven for heating or a freezer for cooling, and which will provide a heat source or a heat sink for an extended period of time; and
        a container constructed for holding the thermal unit and the casserole dish in thermally conductive contact;
    (b) altering the temperature of the thermal unit; and
    (c) placing the thermal unit between the casserole dish and the container.

3. A method according to claim 2, wherein said step of altering the temperature of the thermal unit comprises placing the thermal unit in a microwave oven.

4. A method according to claim 2, wherein said step of manipulating the temperature of the thermal unit comprises placing the thermal unit is a freezer.

5. An apparatus for controlling the temperature of food in a casserole dish according to claim 1, wherein the container comprises handles for carrying the apparatus.

6. An apparatus for controlling the temperature of food in a casserole dish according to claim 1, wherein the casserole dish is constructed of a ceramic material.

7. A method for controlling the temperature of food in a casserole dish according to claim 2, wherein the container comprises handles for carrying the apparatus.

8. A method for controlling the temperature of food in a casserole dish according to claim 2, wherein the casserole dish is constructed of a ceramic material.

* * * * *